United States Patent Office 3,606,260
Patented Sept. 20, 1971

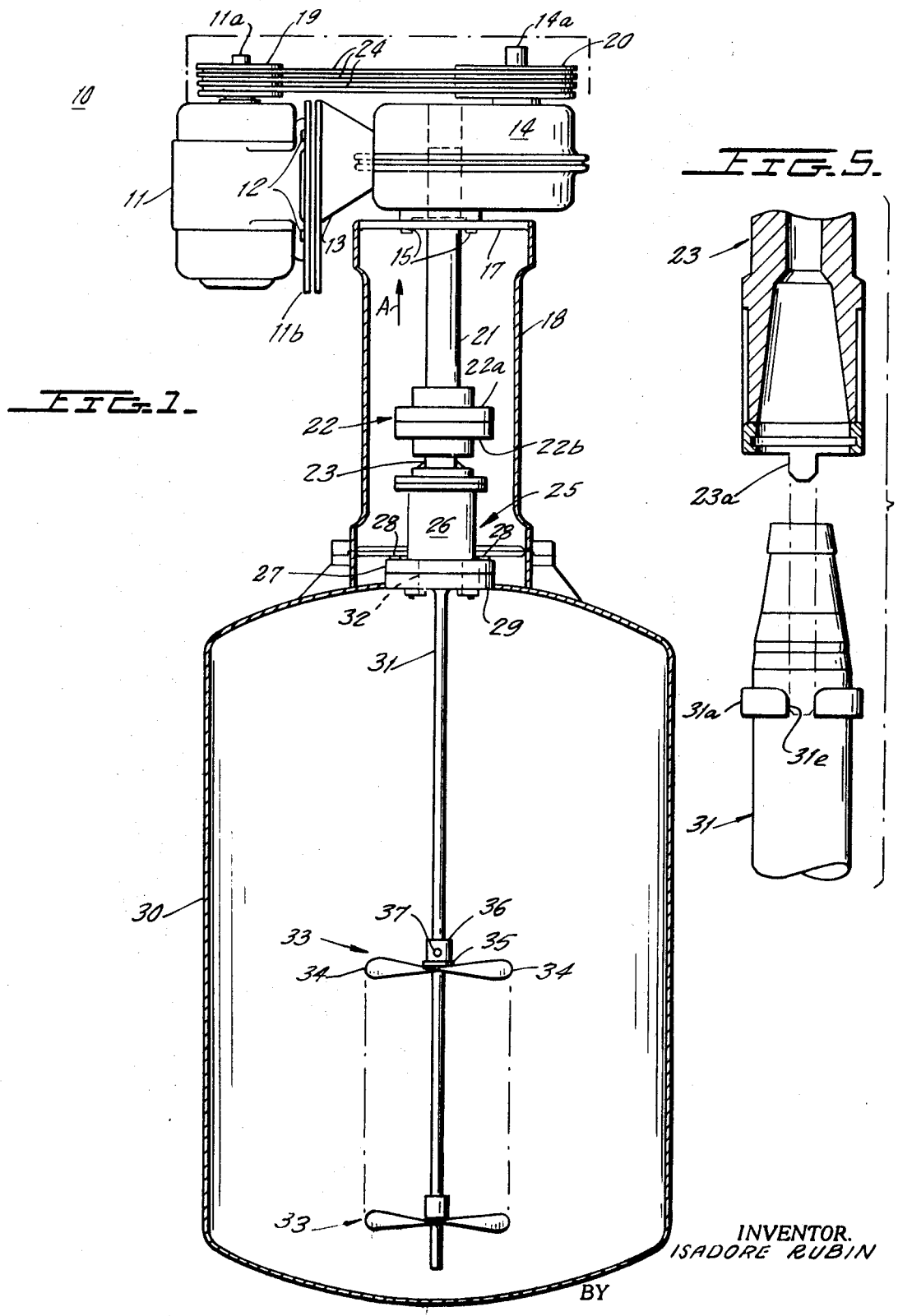

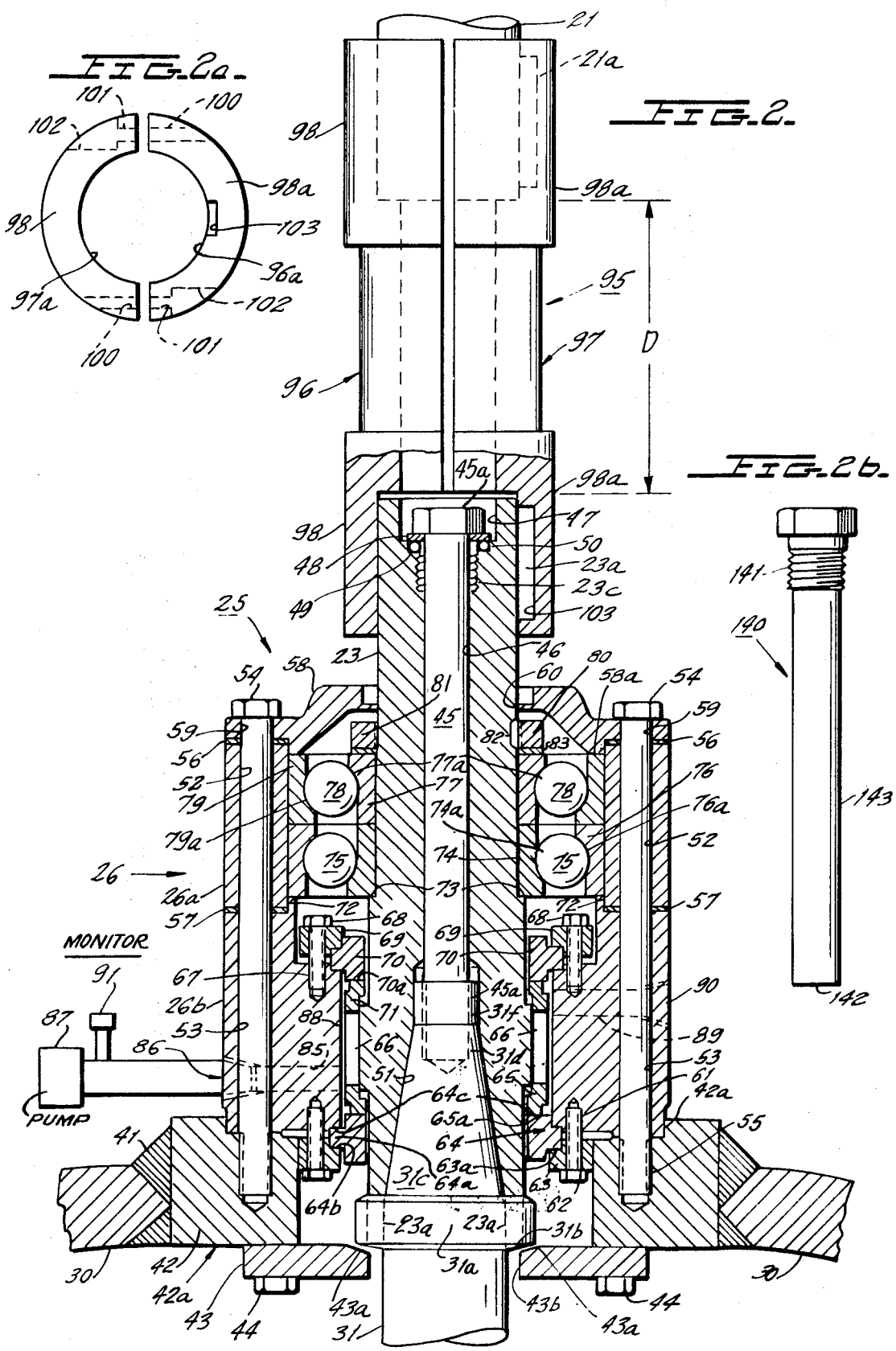

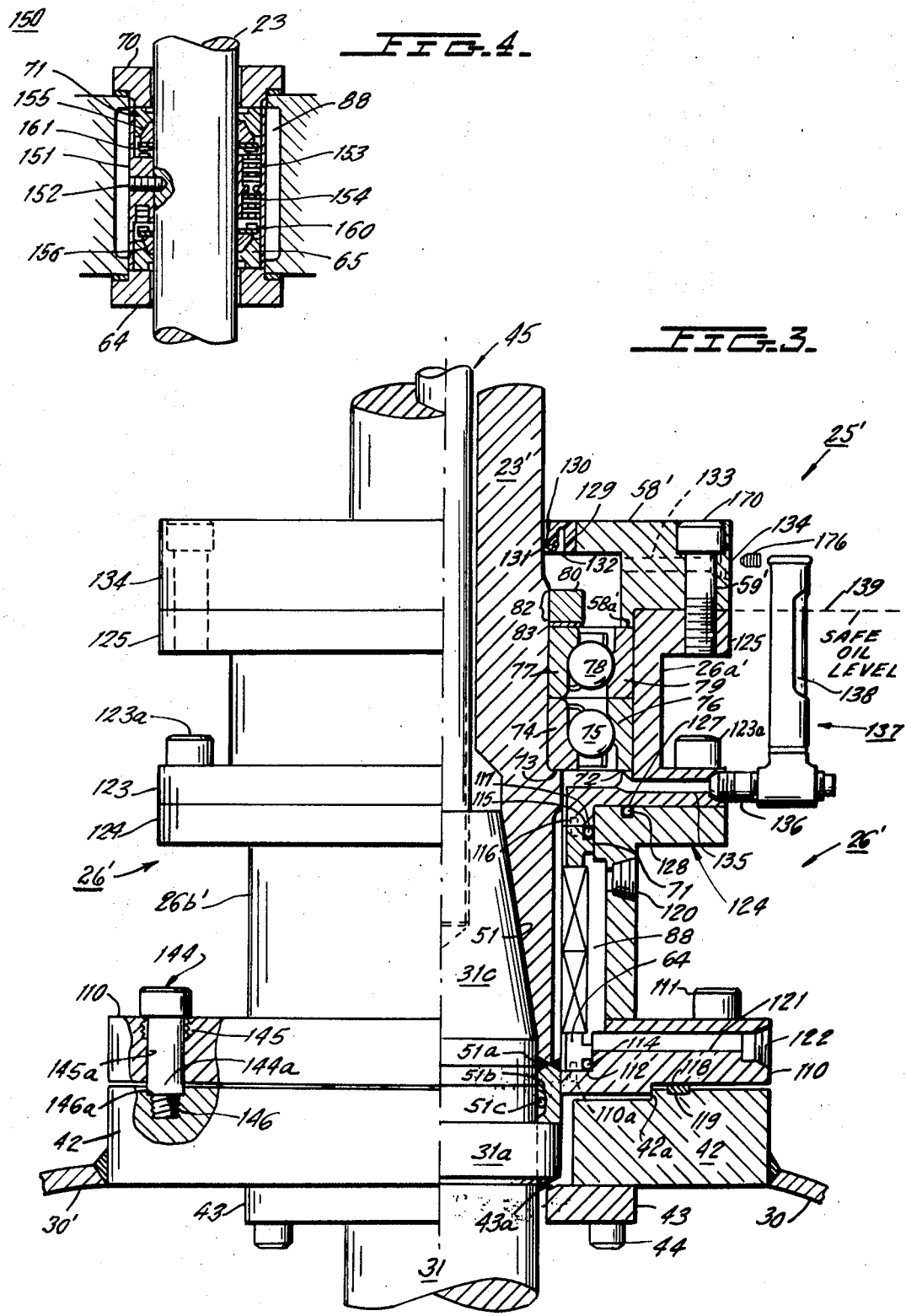

3,606,260
AGITATOR SEAL CARTRIDGE
Isadore Rubin, South Orange, N.J., assignor to
Industrial Process Engineers, Newark, N.J.
Filed Jan. 23, 1969, Ser. No. 793,252
Int. Cl. B01f 7/16; F16j 15/16
U.S. Cl. 259—1
15 Claims

ABSTRACT OF THE DISCLOSURE

This invention describes a new agitator mechanical seal cartridge assembly which may be rapidly removed for maintenance and replaced by a spare or by itself, after repair, without essentially disturbing the remaining agitator components, such as drives (motors or gear reducers) shaft and impellers. This assembly, while designed for agitators, may be employed with pumps or other machinery using rotating shafts where a seal is required.

---

This seal cartridge assembly contains either a single or double mechanical seal, a bearing and a tapered aligning device which permit both rapid removal and insertion of the cartridge assembly between the powered end and the output ends of the shaft. Seal alignment may be carefully performed at a workbench. Shaft alignment occurs automatically when the cartridge assembly is set into place.

The cartridge is a self-contained unit in which all adjustments as to forces imposed upon the mechanical seal, or any other similar adjustments, may be made at a workbench at any time prior to the installation of the cartridge. Because mechanical seal alignment is critical and is seriously affected by shaft run out, the shaft alignment is likewise important and is fully taken into account by providing bearings within the cartridge which are positioned in very close proximity to the mechanical seal.

The cartridge is provided with a hollow, tapered shaft which guarantees easy, quick alignment with the agitator shaft to which it is afixed. A single retaining bolt passing through the hollow shaft to a tapped opening in the agitator shaft is all that is required to secure the two shafts together. An agitator shaft retainer means is provided to hold the agitator shaft in position during the time in which the mechanical seal cartridge is being changed so as to fully avoid the necessity for removing the shaft or appreciably displacing the agitator shaft and subsequently replacing it or vice versa in the performance of the changing operation of the mechanical seal.

Bleed connections are provided for passing a fluid through the mechanical seal housing to maintain the mechanical seal elements within safe temperature ranges and may further be provided with monitoring means for determining differential pressure between the vessel interior and exterior in order to provide a warning caused by near critical or critical pressure differential values or for other control purposes.

In cases where through-shaft driving sources are not employed, coupling means are provided above the cartridge position to allow for sufficient clearance when the coupling is disassembled and removed to permit removal and replacement of the mechanical seal cartridge without moving either the driving source or the agitator shaft.

The instant invention relates to mechanical seals, and more particularly to a novel mechanical seal arrangement provided in cartridge form wherein all adjustments of the mechanical seal elements and any other elements of the cartridge may be performed at any time previous to a cartridge replacement operation, and including novel means for facilitating cartridge removal and replacement as compared with conventional arrangements.

It is often necessary to provide a seal around a rotating shaft where a portion of the shaft passes through a barrier which separates different pressures or differing environmental conditions. For example, a shaft may be attached to a driving source exterior to a vessel, with a portion of the shaft passing through the vessel wall being coupled to agitator blades, in order to perform a mixing operation within the vessel. Quite often it is both desirable and necessary to isolate the chemical environment within such housing from the exterior environment, which function is performed by effecting a seal at a point along the rotating shaft adjacent the position where the shaft enters into the housing.

There are two common methods for providing such a seal. One of the oldest methods of effecting a seal is by means of a stuffing box. In this type of device, compressible stuffing box rings, generally formed of a suitable type of fibre, are squeezed by suitably mounted means, within a constrained annular space about the shaft. The squeezing pressure forces the stuffing box rings to press against the shaft and the constraining wall with appreciable force so as to seal off the interior of the container from the exterior environment.

A more recent development is one in which mechanical seals are employed. In such devices, highly polished metallic or other suitable surfaces rotate in contact with each other and act as a seal. One surface is attached to the stationary container and the other surface is attached to the rotating shaft. Suitable force-exerting means, such as springs, are used to press one surface into firm engagement with the other and thereby effect a suitable rotating seal so as to isolate the internal from the external environments.

Both of the above-described methods have been used for a number of years in applications on agitator shafts. The use of such mechanical seals is growing. However, one basic problem which must be faced is the requirement of replacing worn parts in order to maintain an adequate seal. In the case of mechanical seals, the polished faces wear and must be replaced at certain intervals. Whereas only the seal assembly in actuality is involved in the replacement operation, criticality of proper adjustment of the mechanical seals, in accordance with present-day techniques, requires proper alignment of the attached shafts. Since the alignment of some seal assemblies can take as much as several days, this means that the equipment employing the seal is out of operation for the entire period required to effect proper alignment of the seal.

The instant invention overcomes all of the disadvantages of present-day techniques by providing a novel mechanical seal in the form of a cartridge, or substantially self-contained assembly which may be easily removed and replaced as a unit.

With the use of the cartridge, all of the fine adjustments of spring tension and seal positioning may be made far in advance of the replacement operation at a suitable work area and these adjustments may be made without any need for making adjustments of the equipment receiving the new mechanical seal cartridge, the only requirement being that the old cartridge be removed and a new cartridge be inserted and affixed to the equipment by suitable fastening means which automatically causes the necessary shaft alignment.

The cartridge is provided with a shaft portion, one end of which is coupled to the output shaft of the driving source, and the other end of which is coupled to the driven device such as, for example, the shaft and blades of an agitator assembly. By simply keeping such a mechanical seal cartridge in stock, replacement of the seal can be done in minutes simply by removing the worn cartridge and replacing it with a new one.

If the shaft wobbles or runs out, mechanical seals tend to wear out much more rapidly, or are caused to crack as a result thereof. In order to lengthen seal life, it is preferable to locate one of the shaft bearings as close to the mechanical seal position as possible, thereby reducing wobble and run out at the seal. This feature is achieved by providing bearings which are included as part of the cartridge.

The mechanical seal cartridge of the instant invention is comprised of a shaft portion, one end thereof being adapted for coupling with the driving source. The cartridge shaft is hollow along its entire length, and is provided with a tapered opening positioned at the other end thereof for receiving the shaft of a driven assembly such as, for example, the shaft and blades of an agitator assembly. The end of the driven shaft is provided with a tapered end portion which is complementary to the taper provided in the hollow cartridge shaft and assures proper alignment therebetween.

The mechanical seal cartridge is provided with a housing portion receiving fastening means at one end thereof for engaging a mounting portion of the vessel or stationary container and adapted to be secured to a mating surface of the vessel.

The stationary sealing face of the mechanical seal is secured to the housing by suitable pin means, or other keying or locking means. The rotating sealing face element of the mechanical seal is fixed to the cartridge shaft so as to rotate therewith by means of a mechanical seal casing which is rigidly fixed to the cartridge shaft by suitable fastening means. The mechanical seal casing is provided with spring means arranged to be urged against the rotating mechanical seal element to maintain suitable contact pressure between the two mechanical seal members, i.e., the rotating and stationary mechanical seal members. Contact pressure between the mechanical seal mating surfaces may be adjusted through the insertion of one or more compression rings of either similar or dissimilar thicknesses so as to achieve the exact contact pressure desired. If desired, a second mechanical seal may be provided in the cartridge whose components are substantially identical in design and operation to the first mechanical seal assembly described hereinabove, and creating a chamber between the seals which one seal separates from the vessel contents and the other seal separates from the atmosphere.

A bearing assembly comprised of inner and outer races separated by ball bearings is positioned in close proximity to the mechanical seal arrangement. The inner bearing race is substantially fixedly secured to the cartridge shaft member so as to rotate therewith, while the outer bearing race is fixedly secured to the cartridge housing.

A bleed line is provided in the cartridge housing to receive a suitable lubricant for the ball bearing assembly, and may further be provided with a visually observable lubricating fluid level indicator in order to determine whether the lubricant level is sufficient or whether an additional amount of lubricant is required.

The mechanical seal housing contains two conduits which may be used as an inlet and outlet, respectively, for the circulation of lubricant and/or coolant through the space occupied by the mechanical seal components hereafter referred to as a mechanical seal bleed channel. Monitoring means may be provided to maintain the coolant at a pressure level higher or lower than the pressure level in the agitator housing or housing into which the driven shaft extends and which has sufficient sensitivity so as to indicate when the pressure in the agitator housing deviates from the normal pressure in the bleed channel receiving the coolant so as to provide an indication of the presence of a possibly critical condition.

The cartridge assembly is affixed either to an agitator assembly or an agitated vessel by flange means having suitable fastening means for securing the cartridge housing to the agitator housing. The cartridge shaft, which is hollow, receives an elongated retaining bolt which passes through the hollow shaft and threadedly engages the driven (agitator) shaft. Coupling means are provided for rigidly coupling the opposite end of the cartridge shaft to the driving or power supply shaft.

Removal of the mechanical seal cartridge is effected by removing the fastening means coupling the cartridge assembly to the agitator assembly or the housing assembly as the case may be and removing the rotating coupling which secures the cartridge shaft to the drive shaft. In the case where a through-shaft type driving source (e.g. hollow shaft drive) is employed, the driving shaft may be moved upwardly by an amount which is sufficient only to provide enough clearance for removal of the mechanical seal cartridge which, in one preferred embodiment, is less than several inches. In the case where the driving source is not of the through-shaft type, a spacer coupling having a removable spacer portion is employed for coupling the driving shaft to the cartridge shaft. Extraction of the removable spacer portion provides more than adequate clearance for removal of the seal cartridge assembly. After the driving shaft is lifted to provide a sufficient amount of clearance (if the through-shaft type of driving source is employed) or after the spacer coupling removable spacer portion is removed, the retaining bolt is disengaged to decouple the cartridge shaft from the agitator shaft within the vessel. A retaining ring assembly is provided within the interior of the vessel adjacent the opening receiving the driven shaft. The driven shaft is provided with a collar, one shoulder of which abuts the retaining ring so as to hold the driven shaft in substantially its normal operating position and thereby prevent it from dropping appreciably into the vessel, as well as avoiding the need for lifting or supporting the driven shaft upwardly, as is the case in conventional equipment. The fastening means coupling the seal cartridge assembly to the agitator assembly or housing assembly may then be removed, thereby enabling removal and replacement of the cartridge in a much more simple and straightforward manner than was heretofore possible.

The collar described above is slotted to engage projections extending from the bottom of the seal cartridge shaft. This provides a positive means of power transmission from the seal cartridge shaft to the driven shaft without reliance on friction between the matching tapered surfaces of these two shafts. Since, in operation this eliminates relative rotation of the shaft, the tapered matching surfaces are used only for maintaining accurate shaft alignment.

If, after protracted use, the mating surface of the tapered shafts do not separate when the retaining bolt is disengaged then the retaining bolt is removed and a jack screw is inserted in its place. The jack screw engages its own threads in the seal cartridge shaft and will force the tapered shaft apart when threaded in. Since the driving and driven shafts must be properly aligned, relatively close tolerances are provided between the cartridge assembly and the recess in the vessel which receives the lower end of the cartridge assembly. Since these elements may be difficult to separate after protracted use, similar jack shafts may be inserted into the threaded openings receiving the fastening bolts for freeing the cartridge assembly from the vessel.

It is therefore one object of the instant invention to provide a novel mechanical seal cartridge assembly for use in sealing the shaft penetration of a vessel which receives a rotating shaft.

Another object of the instant invention is to provide a novel cartridge seal assembly mounted between a driving and a driven shaft for providing an adequate seal in a vessel having an opening for receiving the driven shaft wherein the mechanical seal cartridge is adapted to be adjusted for coupling to the driving and driven shafts so as to greatly facilitate the removal and replacement operations.

Yet another object of the instant invention is to provide a novel cartridge seal assembly mounted between a driving and a driven shaft for providing an adequate seal in a vessel having an opening for receiving the driven shaft wherein the mechanical seal cartridge is adapted to be adjusted for removable coupling to the driving and driven shafts so as to greatly facilitate the removal and replacement operations, and which is further provided with means for retaining the driven shaft substantially in place after the worn cartridge assembly is removed and before the new cartridge assembly is inserted so as to greatly facilitate the removal and replacement operations.

Still another object of the instant invention is to provide a novel cartridge seal assembly mounted between a driving and a driven shaft for providing an adequate seal in a vessel having an opening for receiving the driven shaft, wherein the mechanical seal cartridge is adapted to be adjusted for coupling to the driving and driven shafts so as to greatly facilitate the removal and replacement operations, and wherein the cartridge assembly is further comprised of a hollow shaft having a tapered portion at one end thereof for receiving a complementary tapered portion of the driven shaft so as to greatly facilitate alignment therebetween, and further so as to receive a single retaining bolt to secure the above-mentioned shafts to one another.

Still another object of the instant invention is to provide a novel cartridge seal assembly comprising a hollow shaft having a tapered portion at one end thereof, wherein one surface of the mechanical seal is secured to the cartridge housing, the mating surface is secured to the cartridge hollow shaft, and further is comprised of bearing means located in close proximity to the mechanical seal assembly to cause the shaft to run true during the operation thereof.

Still another object of the instant invention is to provide a novel cartridge seal assembly comprising a hollow shaft having a tapered portion at one end thereof, wherein one surface of the mechanical seal is secured to the cartridge housing, the mating surface is secured to the cartridge hollow shaft, and further is comprised of bearing means located in close proximity to the mechanical seal assembly to cause the shaft to run true during the operation thereof, and wherein the cartridge housing is further provided with a bleed channel for receiving a coolant under pressure to reduce the operating temperature of the mechanical seal, and which may further be provided with monitoring means for maintaining the pressure in the bleed channel at a higher level than the pressure in the vessel, and being capable of indicating when the pressure in the vessel exceeds the pressure in the bleed channel, or vice versa.

Yet another object of the instant invention is to provide a novel cartridge seal assembly comprising a hollow shaft having a tapered portion at one end thereof, wherein one surface of the mechanical seal is secured to the cartridge housing, the mating surface is secured to the cartridge hollow shaft, and further is comprised of bearing means located in close proximity to the mechanical seal assembly to cause the shaft to run true during the operation thereof, and further comprising spacer coupling means for coupling the hollow cartridge shaft to the driving shaft, and having a removable spacer portion to provide sufficient clearance for the removal of the worn cartridge assembly in order to greatly facilitate the removal and replacement operations.

Still another object of this invention is to provide a novel cartridge seal assembly comprising a hollow shaft having a tapered portion at one end thereof for securement to a tapered driven shaft wherein the hollow shaft is provided with threaded means at the end furthest removed from the tapered end for receiving and being threadedly engaged by a jack screw which may be inserted for the purpose of facilitating the separation and removal of the above-mentioned shafts.

Another object of this invention is to provide a novel cartridge seal assembly, including a cartridge housing having a first end thereof adapted to be received within a recess provided in a vessel and including threaded openings for receiving jack screws which may be inserted in place of the normal fastening means for the purpose of facilitating separation and removal of the cartridge assembly from the vessel.

Still another object of this invention is to provide a novel cartridge seal assembly comprising a hollow shaft having a tapered portion at one end thereof for receiving the tapered end of a driven shaft, said tapered driven shaft being provided with a collar having slots at spaced intervals around its periphery for receiving projections provided on the hollow tapered shaft to assure efficient power transmission between the cooperating shafts.

These as well as other objects of the instant invention will become apparent when reading the accompanying description and drawings in which:

FIG. 1 is an elevational view showing a mixer assembly which is adapted for receiving a mechanical seal cartridge designed in accordance with the principles of the instant invention.

FIG. 2 is a sectional view showing one preferred embodiment of the cartridge seal of the instant invention.

FIG. 2a is a top view showing the compression coupling of FIG. 2 in greater detail.

FIG. 2b is an elevational view showing a jack screw for use with the cartridge housing of FIG. 2.

FIG. 3 is a sectional view showing another preferred embodiment of the cartridge seal of the instant invention.

FIG. 4 is a sectional view showing one mechanical seal assembly which may be employed in the mechanical seal cartridges of the instant invention.

FIG. 5 shows a detailed view of the cooperating slots and projections provided in the driven shaft and cartridge shaft, respectively, for effecting the power transmission.

Referring now to the drawings, FIG. 1 shows an agitator assembly which may employ the cartridge assembly of the instant invention to great advantage. The agitator assembly 10 is comprised of a motor 11 having an output shaft 11a. The base or support 11b of the motor is secured by suitable fastening means 12 to a mounting bracket 13 which, in turn, is secured to a drive means 14 along one side thereof. The drive means 14 is secured by suitable fastening means 15 to the top surface 17 of a drive support 18. Drive means 14 is provided with an input shaft 14a. Both of the shafts 11a and 14a have rigidly secured thereto pulleys 19 and 20, respectively, which receive a plurality of drive belts 24 positioned in suitable grooves provided around the periphery of each of the pulleys. One belt may sometimes suffice.

The drive means 14 is provided with a suitable mechanism internally of its housing and not shown for purposes of simplicity so as to convert the angular velocity of shaft 14a to a suitable angular velocity for rotating the driving shaft 21, the upper end of which extends into the interior of the drive means 14 and which is rotated in accordance with the speed conversion function performed by the drive means 14.

The driving shaft 21 extends downwardly and is coupled at its lower end to the upper end of the cartridge assembly shaft 23 of cartridge assembly 25 by means of a rigid flanged coupling 22. The cartridge assembly 25 is provided with a suitable housing 26 having flanges 27 at the lower end thereof for receiving fastening means 28 to rigidly secure the seal cartridge housing to a suitable surface 29 provided on vessel 30. The shaft 23 is coupled, by means not shown in FIG. 1 and to be more fully described, to a driven shaft 31 extending downwardly through a suitable opening 32 provided in the vessel.

The driven shaft 31 extends downwardly toward the bottom of the vessel 30 and has secured thereto one or more blade assemblies 33 each of which is provided with a plurality of blades 34 arranged about and secured to a blade mounting member 35 which has a suitable centrally located opening having a collar 36 rigidly secured thereto, which collar, in turn, is rigidly secured to driven shaft 31 by means of at least one pin 37, for example, so as to rigidly position and secure the blade assembly 33 (or plural blade assemblies, if desired) to driven shaft 31 and to transmit power.

FIG. 2 shows one preferred embodiment of the seal cartridge assembly 25 of FIG. 1 in greater detail. As shown in FIG. 2, the head portion of the vessel 30 has welded thereto at 41 a mounting ring 42 designed to receive the lower end of the cartridge assembly 25. The interior surface 42a of the mounting ring 42 has secured thereto a rigid supporting ring 43 secured to mounting ring 42 by suitable fastening means 44. Although only two such fastening means are evident from FIG. 2, it should be understood that a greater number may be employed and dispersed at regular intervals around the supporting ring 43. The supporting ring 43 is provided with a bevelled annular surface 43a adjacent its central opening 43b for maintaining the driven shaft 31 in position during a cartridge removal and replacement operation, as will be more fully described.

The upper end of the driven shaft 31 is provided with a collar 31a positioned above the supporting ring 43 and having one bevelled surface 31b for cooperation with the bevelled surface 43a of the supporting ring in a manner to be more fully described. The portion of the driven shaft 31 above collar 31a tapers toward its upper end to form a truncated conical portion 31c above the collar 31a. The top end of shaft 31 is of a smaller diameter than that below collar 31a and is provided with a threaded opening 31d for receiving and threadedly engaging the shaft retaining bolt 45, in a manner to be more fully described.

As shown in FIG. 5, the collar is provided with a slot 31e for receiving a projection 23a provided at the lower end of hollow shaft 23. As can clearly be seen slot 31e is tapered at its upper ends and projection 23a is tapered at its lower ends to facilitate insertion of the projection 23a into the slot 31e during the time at which a cartridge is inserted. While not shown, it should be understood that a pair of slots are provided in collar 31a arranged at 180° intervals around the collar. Likewise, a pair of projections 23a are arranged at 180° intervals so as to be in alignment with the slots 31e. The purpose of providing the cooperating slots and projections 31e and 23a, respectively, is to provide for efficient power transmission between hollow shaft 23 and driven shaft 31 without relying upon the frictional coupling between the engaging surfaces of the hollow tapered portion of shaft 23 and the tapered conical shaped portion of driven shaft 31. In some cases it may be desirable to provide more than two slots and more than two projections to provide for increased torque transmission. As the cartridge is inserted, if the slots and projections are not in alignment, the alignment may be very easily obtained simply by rotating shaft 23 which is rotatably mounted within the cartridge housing by means of bearings (to be more fully described) until the projections are in alignment with the slots. The tapered portions of the slots and projections facilitate insertion of the projections into the slots. However, the vertical portions of the slots and projections which engage one another are responsible for the power transmission.

Continuing with consideration of FIG. 2, the cartridge assembly 25 considered in detail is comprised of a hollow shaft 23 for receiving retaining bolt 45 and is further provided with a widened opening 47 joined to the narrower elongated hollow portion 46 by a shoulder 48 which receives and supports the head 45a of the retaining bolt 45. As can clearly be seen, the head of the retaining bolt 45 is recessed within the wider opening 47. An annular groove 49 is provided in the shoulder 48 to receive an O-ring 50 and provide a good rigid seal therebetween. The hollow opening 46 is tapered at 51 along the lower end thereof so as to provide a tapered opening for facilitating entry and positioning of the truncated conical and smaller diameter portion 31c of driven shaft 31 in a manner to be more fully described.

The cartridge housing 26 is comprised of two substantially cylindrical housing members 26a and 26b which may also be referred to as the bearing and mechanical seal housings, respectively. Each of the cylindrical housing members are provided with a plurality of openings 52 and 53, respectively, positioned at discrete intervals around each of the housings for receiving elongated fastening means 54 which threadedly engage associated tapped openings 55 provided in the vessel retaining member 42 so as to rigidly secure the cartridge housing to the vessel. Resilient sealing rings 56 may be provided at the upper end of housing portion 26a and similar resilient sealing rings 57 may be provided between the housing members 26a and 26b and having openings arranged at each of the openings 52 and 53 in each of the housing members, which openings are coaxial with one another so as to facilitate insertion and fastening of the elongated fastening bolts 54.

A cartridge housing cover 58 is provided in the upper end of the cartridge assembly and has a plurality of suitable openings 59 enabling the elongated fastening bolts 54 to pass therethrough. The housing cover 58 is further provided with a centrally located opening 60 to permit passage of the cartridge shaft 23.

The lower end of mechanical seal housing member 26b is provided with a plurality of threaded openings 61 (only two of which are shown in FIG. 2) each of which receives and threadedly engages a bolt 62 which acts to rigidly secure a mechanical seal retaining ring 63 to the housing portion 26b. The retaining ring 63 is provided with a shoulder 63a which supports an annular-shaped stationary sealing face 64 having a collar portion 64a whose lower surface 64b rests upon and is supported by the shoulder 63a of supporting irng 63. The upper surface 64c of the stationary sealing face member 64 forms one surface of the mechanical seal. The other mechanical seal member 65 is a substantially annular-shaped member having a highly polished surface 65a which makes surface contact with the highly polished mechanical seal surface 64c forming a first mechanical seal therebetween. Suitable adjustable spring biasing means 66, to be described in more detail subsequently, acts to urge the mechanical seal member 65 downwardly in order to provide adequate contact pressure between the two mating mechanical seal surfaces.

The cartridge housing portion 26b is further provided with a plurality of tapped apertures 67 (only two of which are shown in FIG. 2) for receiving and threadedly engaging fastening bolt 68 to secure a second mechanical seal retaining ring 69 to the housing portion 26b. The retaining ring 69 is substantially identical in design and function to retaining seal 63 and acts to rigidly retain in place a stationary annular-shaped sealing face 70 which is substantially identical in design and function to the stationary sealing face 64, and will not further be described in detail for purposes of simplicity. The highly polished mechanical seal surface 70a engages the highly polished mechanical seal surface of a rotating annular-shaped sealing face member 71 which is substantially identical in design and function to the rotating sealing face member 65. In a like manner, member 71 is urged into rigid surface contact with member 70 by the spring biasing means 66, to be described in greater detail.

The cartridge housing portion 26b is provided with an annular-shaped projecting portion 72 which facilitates the mounting and alignment of cartridge housing portion 26a thereto.

The hollow cartridge shaft 23 is provided with a shoulder 73 which supports an internal bearing race 74 which is an annular-shaped member having a centrally located opening for receiving hollow shaft 23 and which is further provided with an arcuate-shaped exterior surface portion 74a for adequately positioning a plurality of ball-bearings 75 around its periphery. An exterior ball-bearing race 76 has a substantially annular configuration and is supported along one surface thereof by the projecting portion 72 of cartridge housing portion 26b. The interior surface of member 76 is provided with an arcuate-shaped portion 76a for positioning the ball-bearings 75 around the interior periphery of member 76.

Similar interior and exterior annular-shaped ball-bearing races 77 and 79 are positioned upon associated members 74 and 76, respectively, and are provided with like arcuate surface portions 77a and 79a, respectively, for positioning the ball-bearings 78.

The interior ball-bearing races 74 and 77 are sandwiched between the shoulder 73 provided on the periphery of cartridge shaft 23 and an annular-shaped bearing nut 80 having a threaded interior surface 81 which threadedly engages a threaded portion 82 provided along one surface portion of the shaft 23. A suitable lock washer 83 is positioned between the upper surface of bearing mounting 77, and the bearing nut 80. By suitably tightening the bearing nut 80, this causes the mounting members 74 and 77 to be firmly held between the bearing nut 80 and the shaft shoulder 73, thereby causing the bearing mountings 74 and 77 to rotate with shaft 23.

The external bearing mountings 76 and 79 are wedged between the projection 72 provided along the top surface of cartridge housing portion 26b and the annular-shaped surface portion 58a of cartridge housing cover 58. By suitably tightening the elongated fastening bolts 54, the ball-bearing mounting members 76 and 79 are tightly wedged between the cartridge housing cover 58 and cartridge housing portion 26b so as to remain stationary at all times regardless of the rotation of shaft 23. The ball-bearings 75 and 78 act to retain the cartridge assembly shaft 23 against wobbling while, at the same time, maintaining very low frictional coupling between the internal and external ball-bearing mounting members 77–79 and 74–76, respectively.

The cartridge housing portion 26b is provided with a bleed channel 85 having an inlet port 86 for receiving a coolant which may be a gas or liquid, and which may further have lubricating properties. The coolant is urged into the inlet port 86 under pressure by means of a suitable circulating pump 87, for example, causing the coolant to enter inlet port 86, pass through bleed channel 85, enter into the region 88 which surrounds the mechanical seal and spring biasing elements (which hollow region has a substantially annular shape) and to pass through a bleed channel 89 and ultimately to an outlet port 90, which may again be coupled to the circulating and pressure-maintaining means 87 in order to maintain circulation of the coolant in the region occupied by the mechanical seals, as well as maintaining a predetermined pressure in the region of the mechanical seals. The pressure maintained in the hollow region occupied by the mechanical seals may be selected to be higher than the pressure in vessel 30 so as to prevent entry of any gas or gas fumes into the region occupied by the mechanical seals. If, for any reason, the pressure in the enclosed vessel increases to a level above the pressure being maintained in the region of the mechanical seals, and causes the escape of gas or gas fumes from the vessel into the region of the mechanical seals, this may become a hazard. In order to indicate this condition, the pressure-maintaining and circulating system may further be provided with a pressure monitoring device 91 which may further include an audible alarm and/or alarm light (not shown) to indicate a change in differential pressure levels between the vessel interior and the mechanical seal region.

The manner of removal and replacement of a mechanical seal cartridge is as follows:

Considering now FIGS. 1 and 2, in certain assemblies of the type 10 shown in FIG. 1, the drive means 14 may be of the through-shaft type. By that, what is meant is that the driving shaft 21 may be moved vertically upward through the drive means 14, due to the fact that there is clearance through the drive means. In assemblies 10 of this type, the flange coupling 22 is uncoupled by removing the fastening means (not shown) securing the coupling members 22a and 22b to one another. The shaft 21 is then lifted vertically upward in the direction shown by arrow A by an amount to provide sufficient clearance for removal of the cartridge assembly, which is usually of the order of several inches.

After the driving shaft 21 is lifted, a tool is inserted into the hollow shaft opening 47 to loosen retaining bolt 45 so as to decouple hollow shaft 23 from the driven shaft 31. In so doing, the turbine shaft 31 drops by gravity by an amount no more than a small fraction of an inch so that its collar taper 31b is engaged and supported by the supporting ring taper 43a, whereby the bevelled surface 31b of collar 31a engages the bevelled surface 43a of the supporting ring 43. The elongated bolts 54 are then removed and the cartridge assembly is lifted vertically upward by an amount sufficient to cause the hollow shaft 23 to clear the upper surface of the conical portion 31c of driven shaft 31 and then removed horizontally. The new replacement cartridge assembly is then inserted into position, and is positively located by means of the annular cavity 42a provided in the annular member 42 welded to the head of vessel 30. The elongated bolts 54 are then inserted into associated openings in the cartridge assembly housing members and are tightened so as to rigidly secure the replacement cartridge to the head of the vessel. The shaft retaining bolt 45, which is already pre-positioned in the hollow cartridge shaft 23, is then inserted into the threaded opening 31d of driven shaft 31, and is tightened, causing the collar 31a to be lifted upward and away from the supporting ring 43. The elongated retaining bolt 45 is tightened still further so as to rigidly secure turbine shaft 31 to hollow shaft 23. The complementary taper 51 provided in hollow shaft 23 cooperates with the truncated conical portion 31c of shaft 31 to facilitate alignment of cartridge shaft 23 relative to turbine shaft 31.

Driving shaft 21 is lowered into position and the upper half 22a of coupling 22 is rigidly fastened to the lower half 22b by suitable fastening means (not shown). It can clearly be seen from the foregoing that a cartridge removal and replacement operation is quite simple to perform, and requires no special adjustment of the assembly which receives the replacement cartridge.

In agitator assemblies wherein the drive means 14 is not of the through-shaft type, it is not possible, therefore, to elevate the driving shaft 21 in the manner previously described. Therefore, in order to provide sufficient clearance for the removal of the worn cartridge, a spacer coupling assembly of the type shown in FIGS. 2 and 2a may be employed. The spacer coupling assembly 95, also commonly referred to as a compression coupling assembly, is comprised of first and second half-sections 96 and 97, each of which is provided with a semicircular interior surface 96a and 97a, respectively, which, when joined together, form a hollow circular interior. The larger diameter end portions 98 and 98a are provided with suitable means for securing the half-sections 96 and 97 to one another. For example, considering FIG. 2a which shows the larger diameter end portions 98 and 98a at the top end of compression coupling 95, section 98 is provided with a tapped opening 100 and an opening 101 which joins a notched portion 102 for receiving the head of a threaded fastening means (not shown). Similarly, larger diameter portion 98 is provided with a tapped opening 100 and portion 98a is provided with an opening 101 joined by a notched portion 102. A keyway 103 is provided for receiving a key provided in the driving shaft (or driven shaft, as the case may be) to assure good power transmission. When assembled, shaft 21 has its keyed portion 21a resting in keyway 103 provided at the upper end 98a of section 97. The fastening means compress shaft 21 within the hollow circular opening. The engagement of flange or key 21a in keyway 103 assures efficient power transmission from driving shaft 21 to compression coupling 95. The cartridge shaft 23 is likewise provided with a key 23a which is inserted within the lower keyway 103 provided in the lower portion 98a of half-section 97. With all of the fastening means being inserted into the openings 101 and threaded openings 100 (there being a total of four or more such fastening means) the shafts 21 and 23 are compressed within the compression coupling 95. Efficient power transmission is assured by use of the keyways 103 at the upper and lower ends of the compression coupling assembly 95 which receive associated keys 21a and 23a provided in the driving shaft 21 and the cartridge shaft 23, respectively.

Removal of the compression coupling assembly 95 is performed very simply by removing the fastening means from the threaded openings 100 and openings 101 and separating the two half-sections 96 and 97. The separating distance D between the lower end of driving shaft 21 and the upper end of cartridge shaft 23 provides more than sufficient space to facilitate the removal of the cartridge housing for repair and/or replacement purposes.

Whereas one preferred spacer coupling has been described herein, it should be understood that any other suitable spacer coupling may be employed, if so desired.

FIG. 3 shows another preferred embodiment of the mechanical seal cartridge of the instant invention in which all elements similar to those elements shown in the embodiment 25 of FIG. 2 have been designated by like numerals and, since their design and function are substantially identical to those described with reference to FIG. 1, no further description of these elements will be given herein for purposes of simplicity. In addition thereto, only one-half of the cartridge assembly has been shown in FIG. 3, it being understood that the remaining half of the cartridge assembly is substantially the mirror image, with any exception therefrom being as noted below.

The hollow shaft 23' of cartridge assembly 25' in FIG. 3 is slightly different from the shaft 23 of FIG. 2 in that its lowermost portion joins the tapered hollow portion 51 with a substantially cylindrical-shaped opening 51a having an annular-shaped groove 51b for receiving an O-ring 51c. O-ring 51c prevents any gases escaping from the vessel 30 from entering into the region in which the truncated conical portion 31c of shaft 31' is seated, and which further receives the elongated shaft retaining bolt 45.

The cartridge housing 26' of FIG. 3 is a two-piece housing having a flanged lower portion 110 which receives threaded fastening means 111 (which are considerably shorter than the fastening means 54 described with reference to FIG. 2) for securing the cartridge assembly to the mounting ring 42 provided in the head of vessel 30'.

The stationary sealing face member 64 (see also FIG. 4) is positioned upon a shoulder 112 provided in the interior of cartridge housing 26' in member 110, and is suitably keyed to the housing by means of pins 110a which are inserted into cooperating openings (unnumbered) provided in shoulder 112 and in stationary sealing face member 64. This arrangement obviates the need for the mechanical seal retaining member 63, shown in FIG. 2, and thereby greatly simplifies the cartridge assembly. An O-ring 114 is provided in the region defined by a notch in stationary sealing face member 64 and a notch provided along the interior surface of cartridge housing 26' and prevents any gases emitted from the vessel interior from entering into the hollow region 88 surrounding the mechanical seal assembly, so as to prevent admixture of gases emitted from the vessel with the coolant flowing through the hollow region 88 in the same manner as previously described with reference to FIG. 2.

In a similar manner, the stationary sealing face member 71 has its upper surface bearing against the second shoulder 115 provided within the interior of cartridge housing 26b', and is keyed thereto by suitable pin means 116 inserted in cooperating openings in shoulder 115 and in member 71, so as to suitably key stationary sealing face 71 to the cartridge housing 26'.

Another O-ring 117 is provided in a region defined by the configuration of member 71 and housing 26' to retain the coolant within the hollow region 88 provided therefor, and likewise to prevent the ingress of any foreign gas or lubricant into the hollow region 88.

An annular-shaped gasket 118 is fitted into an annular-shaped groove 119 provided in annular-shaped mounting member 42, and acts to seal the vessel interior from the exterior thereof so as to prevent both egress of liquids, fumes or gases from the vessel interior to the outside environment, and likewise to prevent any outside influence from entering into the regions of the vessel or seal interior.

The coolant bleed line in the embodiment of FIG. 3 is comprised of an inlet port 122 for introducing a coolant and/or lubricant into the hollow opening 121 in the flanged portion 110 of housing portion 26b' which, in turn, communicates through hollow region 88 with an outlet port 120 which may be coupled to a similar circulating and pressure-maintaining system previously described with reference to FIG. 2. In certain applications, the pressure of the circulating coolant is kept at a pressure which is approximately 25 p.s.i. greater than the pressure in the vessel interior. Any significant changes in the pressure level may thereby be employed to provide either an audible and/or visible alarm to indicate the presence of a possible critical condition.

The upper half 26a' of the cartridge housing is provided with a plurality of openings (not shown) spaced around a flanged portion 123 in order to receive fastening means 123a (only two of which are shown in FIG. 3) which pass through the openings in cartridge housing portion 26a' and threadedly engage tapped openings (not shown) in a flange 124. This arrangement (as compared with the cartridge assembly of FIG. 2) always assures that the cartridge housing portions 26a' and 26b' are rigidly secured to one another and are not in any danger of being disengaged when being stored. Also, the mounting operation is simpler, and the two housing portions will not disengage themselves from one another while a worn cartridge is being removed, as well as while a replacement cartridge is being inserted.

The cartridge cover member 58' of cartridge assembly 25' is provided with a plurality of openings 59' for receiving the threaded fastening members 170 which pass through openings 59', and threadedly engage tapped openings provided in the upper flanged portion 125 of cartridge housing portion 26a'. Cover member 58' is coupled to cartridge housing portion 26a' in a manner similar to that shown in FIG. 2, and cover member 58' is provided with an annular-shaped surface 58a' for engaging the upper surface of exterior ball-bearing mounting member 79, so as to rigidly secure exterior ball-bearing mounting members 79 and 76 between a shoulder 72 provided within the interior of cartridge housing portion 26a' and bearing surface 58' of cover member 58a'. Interior ball-bearing mounting members 74 and 77 are positioned and rigidly secured between bearing nut 80 and a shoulder 73 provided along the exterior surface of hollow shaft 23' in the same manner as was previously described with reference to the cartridge assembly of FIG. 2.

The cartridge portion 26b', in its top flange 124, is provided with an annular-shaped groove 127 for receiving an O-ring 128 which is compressed between the cartridge housing portions to prevent passage of any gases or other influences in either direction.

The opening 129 provided in cover member 58' receives an annular-shaped clipper-seal 130 having a substantially annular-shaped biasing ring 131 embedded therein. The clipper-seal element 130 is formed of a resilient material which is secured along its exterior one surface thereof to the cover member 58', and which is provided with an annular groove 132, allowing the interior portion thereof to flex and be drawn rigidly against the surface of hollow shaft 23' in order to provide a suitable seal between elements 58' and 23'. The purpose of the seal will be subsequently described hereinbelow.

The cover member 58' is also provided with a bleed channel 133 having a tapped inlet port 134 designed to receive and threadedly engage a threaded closing plug 176. The bleed channel 133 permits the passage of a lubricant therethrough so as to provide suitable lubrication for the ball-bearing assembly. The lubricant passes through the ball-bearing assembly and subsequently through a bleed channel 135 provided in the flange 124 of cartridge housing portion 26a'. This channel 135 is threadedly engaged by a pipe nipple 136 to an oil guage assembly 137. The oil gauge assembly 137 is provided with a transparent window 138 having suitable marking or other indication to indicate a safe oil level. If the oil level is as high as the dotted line 139, then it can clearly be seen that the ball-bearing assembly will be completely immersed in the oil (or other suitable lubricant) to assure adequate lubrication thereof. If the oil level falls below the safe level marking, additional oil may be inserted by removing the plug (not shown) from the inlet port 134 and by inserting additional lubricating fluid to raise the lubricating level to a point as high as or higher than the safe level marking provided on the oil gauge assembly 137. The clipper seal 130 assures that none of the lubricant will escape from the cartridge assembly between the cartridge cover 58' and the cartridge shaft 23' and further acts to keep dirt and dust from entering into the cartridge assembly. The plug (not shown) which is inserted into threaded opening 134 is drilled with a small hole to permit venting the space inside housing 26a'.

FIG. 4 shows a detailed view of a double mechanical seal assembly 150 which may be employed in the cartridge assembly of FIG. 2 and the cartridge assembly of FIG. 3. As shown therein, the double mechanical seal assembly is comprised of a seal case 151 which is rigidly secured to the cartridge shaft 23 by means of a threaded setscrew 152 which threadedly engages an opening provided in the seal case 151. Spring biasing means 153 and 154 are provided on opposite sides of the seal case central portion and bear against upper and lower annular-shaped shaft sealing rings 155 and 156, respectively. These sealing rings have tapered exterior surfaces which engage tapered interior surfaces of upper and lower annular-shaped rotary sealing face members 71 and 65, respectively, causing them to be urged upwardly and downwardly, respectively, as a result of the compression springs 153 and 154, respectively. The upper and lower annular-shaped rotary sealing face members are each provided with highly polished surfaces which engage similarly highly polished surfaces provided on the upper and lower annular-shaped stationary sealing face members 70 and 64, respectively, to form a pair of mechanical seals. As can clearly be seen, the hollow region 88 clearly communicates with the region immediately adjacent the mechanical seal assemblies to enable the coolant to enter this region and substantially lower the operating temperatures of the mechanical seals.

Adjustment of the surface contact pressures between the mechanical sealing surfaces is performed by inserting one or more annular-shaped compression rings positioned between the compression springs and the shaft seal rings 153–155 and 154–156, respectively, in order to provide substantially highly accurate compressional forces to be exerted upon the mechanical sealing surfaces.

Whereas a single mechanical seal assembly may be employed if desired, the dual mechanical seal assembly, as shown best in detail in FIG. 4, is preferred, especially in those instances where it is desired to provide a circulating coolant to reduce the operating temperature of the mechanical seal members.

The removal of a worn cartridge of the type shown in FIG. 3 and replacement of a new cartridge of the same type can be performed in substantially the same manner as described with reference to FIG. 2.

In the case where it is desired to accurately adjust the contact pressures of the mechanical seals shown in FIG. 2, this may be simply and readily performed in the cartridge assembly of FIG. 2 by removing either one or both of the mechanical seal retaining rings 63 and 69 in order to gain access to the mechanical seal assemblies. Contact pressure adjustment is made by adding or removing one or more of the compression rings previously described.

In the case where it is desired to provide accurate contact pressure adjustment for the cartridge assembly of FIG. 3, this may be readily and simply performed by removing the fastening members 123a so as to separate the cartridge housing portions 26a' and 26b' in order to gain access to the dual mechanical seal assembly. All such adjustments can be made any time before a removal and replacement operation is required, thereby reducing these operations significantly as compared with conventional arrangements, and thereby reducing the down time of the equipment requiring such mechanical seals by a significant amount as compared with conventional techniques.

After protracted periods of use the cartridge shaft 23 may adhere to the driven shaft 31 so that it becomes extremely difficult to separate the two shafts from one another. In order to facilitate separation of the shafts so as to enable the cartridge housing to be removed, the hollow interior of shaft 23 is provided with a threaded portion 23c (as shown in FIG. 2) near its upper end, which threaded portion has an inner diameter greater than the diameter of the hollow portion 46. After the retaining bolt 45 is unthreaded and removed, the cartridge assembly should be capable of being lifted out of position for repair and/or replacement. Removal of the retaining bolt 45 should normally cause the driven shaft 31 to drop down by a very small amount so that its collar 31a is supported by the retaining flange 43. If, as a result of protracted use, the shafts 23 and 31 fail to separate from one another, the retaining bolt 45 may be removed and replaced by a jack screw 140, shown in FIG. 2b. The jack-screw 140 is provided with a threaded portion 141, designed to threadedly engage the tapped portion 23c of shaft 23. The bottom portion 142 of jack screw 140 is a substantially flat surface designed to bear upon the upper surface of tapered conical shaft 31. It should be noted that the threaded portion 45a of retaining bolt 45 and the tapped opening 31f of shaft 31 are of a smaller outer diameter than the diameter of opening 46 provided in shaft 23. Since the outer diameter of the lower portion 143 of jack screw 140 is substantially greater than the outer diameter of the tapped opening 31f in shaft 31, the bottom surface 142 of jack screw 140 will not enter into the tapped opening but will rest upon the upper surface of shaft 31.

In order to separate the shafts 23 and 31, the jack screw 140 is inserted into opening 46 and is rotated once the threads 141 and tapped aperture section 23c engage one another. By rotating jack screw 140, the lower portion 142 is caused to bear against the upper surface of shaft 31, driving it downwardly and loosening it sufficiently to separate the two shafts 23 and 31. Once the shafts have been separated and the shaft 31 drops to the point where it is supported by retaining flange 43, the jack screw 140 may be unscrewed and removed, allowing removal of the cartridge assembly.

The recess 42a provided in plate 42, which is welded to vessel 30 (see FIG. 3) is designed to receive the mating surface of member 110 to assure proper alignment of the cartridge assembly upon the vessel. Since these mating elements are formed so as to have fairly close tolerances to assure appropriate alignment, it is further possible that these elements will not separate easily after protracted periods of use in the same manner as was described above with respect to shafts 23 and 31. For this reason, a similar jack screw 144 may be inserted in place of the fastening members 111 which normally secure the cartridge housing to the vessel. As shown in FIG. 3, the opening in flange 110 is provided with a tapped portion 145, having an inner diameter which is greater than the untapped portion 145a of the opening. The tapped potrion 146 in plate 42 is provided with a smaller outer diameter relative to the untapped portion 145a so as to receive a fastening member. A jack screw 144 having a threaded portion designed to threadedly engage tapped portion 145 is threadedly inserted into the opening so that its lower surface 144a is caused to bear upon the shoulder 146a surrounding tapped opening 146. By tightening jack screw 144, the flange 110 and hence the cartridge assembly is caused to be lifted upwardly and away from the mounting plate 42.

Although this invention has been described with respect to its preferred embodiments thereof, it should be understood that many variations and modifications thereof, will not be obvious to those skilled in the art and it is preferred, therefore, that the scope of the invention be limited not by the specific disclosure herein, but only by the appending claims.

What is claimed is:

1. In an assembly comprising a driving shaft, a driven shaft and a barrier having an opening for receiving at least the driven shaft and for isolating the regions on opposite sides of the barrier from one another, the improvement comprising a replaceable cartridge assembly mounted to said barrier for sealing said opening, said cartridge assembly comprising:

a shaft section having a first end adapted for coupling to said driving shaft and a second end adapted for coupling to said driven shaft;

said shaft section having a hollow interior, a portion of which is tapered to facilitate entry and alignment of the adjacent end of said driven shaft;

said driven shaft first end having a flange spaced inwardly from said adjacent end and being tapered between said flange and the adjacent end thereof to be easily aligned with said shaft section hollow tapered portion, said flange having at least one slot along its periphery;

said driven shaft adjacent end having a threaded aperture;

said shaft section having at least one projection adapted to be seated in said recess to facilitate alignment therebetween and to transmit rotation of said shaft section to said driven shaft;

said cartridge assembly further comprising an elongated threaded retaining bolt inserted in said shaft section hollow interior and threadedly engaging the tapped aperture in said driven shaft to rigidly secure said shaft section to said driven shaft;

a supporting ring being secured to said barrier and surrounding said opening and adapted to abut the flange of said driven shaft for supporting said driven shaft substantially in its normal operating position when said retaining bolt is removed from said driven shaft;

said cartridge assembly having a housing surrounding said shaft section and having a plurality of openings;

fastening means inserted through the openings in said housing and threadedly engaging said barrier for securing said cartridge assembly to said barrier;

a first mechanical seal assembly positioned to surround said shaft section and positioned adjacent said barrier, said mechanical seal assembly comprising a first annular shaped stationary seal member secured to said cartridge housing and having at least one highly polished surface surrounding said shaft section;

a first annular shaped rotary seal member secured to said shaft section and having a highly polished surface surrounding said shaft section and engaging the highly polished surface of said first stationary member;

first adjustable bias means surrounding said shaft section for urging said first rotating seal member into firm contact with said first stationary seal member;

a ball bearing assembly mounted within said cartridge assembly adjacent said mechanical seal assembly to restrain said shafts from wobbling during rotation.

2. The device of claim 1 wherein said cartridge assembly housing is provided with first and second bleed channels coupling the hollow space surrounding said mechanical seal assembly with the exterior of said cartridge housing.

3. The device of claim 2 further comprising a closed circulating system coupled to said first and second bleed channels for circulating a coolant through said channels and said hollow space to reduce the operating temperatures of said mechanical seal assembly.

4. The device of claim 1 wherein said cartridge housing is further provided with first and second bleed channels coupling the region containing said ball-bearing assembly to the exterior of said housing;

removable plug means provided in one of said channels at the exterior of said cartridge housing for inserting a lubricant;

an oil level gauge assembly coupled to said second bleed channel at the exterior of said cartridge housing and having a transparent lubricant level indicating portion for determining the level of lubricant in said ball bearing region.

5. The device of claim 1 further comprising a second mechanical seal assembly positioned a spaced distance from said first mechanical seal assembly, said second mechanical seal assembly positioned to surround said shaft section and positioned adjacent said barrier, said mechanical seal assembly comprising a second annular shaped stationary seal member secured to said cartridge housing and having at least one highly polished surface surrounding said shaft section;

a second annular shaped rotary seal member secured to said shaft section and having a highly polished surface surrounding said shaft section and engaging the highly polished surface of said second stationary member;

said first adjustable bias means surrounding said shaft section urging said second rotary member into firm contact with said second stationary member.

6. The device of claim 1 further comprising a removable coupling assembly coupling the first end of said shaft section to said driving shaft.

7. The device of claim 6 wherein said coupling assembly is comprised of first and second collars secured to adjacent ends of said driving shaft and said shaft section respectively;

first and second flanged couplings each cooperating with its associated collar to provide means for keying the ends thereof to the associated collar of each coupling;

a removable spacer member positioned between the ends of said couplings facing one another;

the flanges provided on said couplings and said spacer member each being provided with openings which are in alignment with one another;

fastening means passing through said aligned openings to secure said couplings and said spacer to one another;

said spacer being of a thickness sufficient to permit at least one of said couplings to be unkeyed and removed from its associated collar to provide sufficient clearance for removal of a cartridge assembly.

8. The device of claim 1 further comprising a driving source for rotating said driving shaft;

said barrier being an enclosed vessel for housing material to be agitated;

said driven shaft extending into the interior of said vessel;

at least one agitator blade assembly being coupled to said driven shaft for agitating the materials in said vessel.

9. The device of claim 3 wherein said circulating system is further comprised of means for maintaining the coolant at a predetermined pressure level higher than the pressure level on the side of said barrier opposite said cartridge assembly.

10. The device of claim 3 further comprising monitor means for providing an alarm to indicate a change in said predetermined pressure level.

11. The device of claim 1 wherein the flange of said driven shaft is provided with a plurality of slots arranged at intervals around its periphery;

a plurality of projections being provided at spaced intervals at the end of said shaft section adjacent said driven shaft to be engaged by said slots to effect power transmission.

12. The device of claim 1 wherein the diameter of the threaded aperture provided in the driven shaft is smaller than the diameter of the untapered portion of said shaft section;

the first end of said shaft section having a tapped portion of an inner diameter greater than the diameter of the untapered portion adjacent thereto;

a jack screw having a threaded portion at its upper end for threadedly engaging the tapped portion of said shaft section and having a lower end adapted to bear against the top surface of said driven shaft to facilitate separation of said shaft section from said driven shaft.

13. The device of claim 1 wherein the openings provided in said housing each have a threaded portion of an inner diameter greater than the diameter of the opening;

the outer diameter of said threaded opening in said barrier being narrower than the housing openings;

a jack screw having a threaded portion near a first end adapted for threaded engagement with said threaded portion and having a second end engaging the surface surrounding the tapped opening in said barrier to separate the cartridge housing from the barrier.

14. The device of claim 1 wherein said driven shaft is provided with a collar positioned adjacent its tapered portion; at least one slot being provided in said collar;

said shaft section having at least one projection extending toward said collar and adapted to fit within said slot for locking said driven shaft to said shaft section.

15. The device of claim 14 wherein a pair of slots are arranged at spaced intervals around said collar and a pair of mating projections are provided at similarly spaced intervals about said shaft section to lock said driven shaft to said shaft section.

References Cited

UNITED STATES PATENTS

| | | | |
|---|---|---|---|
| 2,612,391 | 9/1952 | Boutros | 277—64X |
| 2,627,171 | 2/1953 | Brumagim | 64—1 |
| 2,830,801 | 4/1958 | Stratienko et al. | 64—1X |
| 2,911,240 | 11/1959 | Boutros et al. | 277—9 |
| 2,945,711 | 7/1960 | Dykman | 308—36.1 |
| 3,076,684 | 2/1963 | Todtenhaupt | 64—1X |
| 3,115,333 | 12/1963 | Lennon | 259—107 |
| 3,246,902 | 4/1966 | Harrison | 277—9X |

FOREIGN PATENTS

| | | | |
|---|---|---|---|
| 567,543 | 10/1957 | Italy | 259 |

JAMES KEE CHI, Primary Examiner

U.S. Cl. X.R.

64—1; 259—107; 277—9, 64; 308—36.1